United States Patent Office 3,027,394
Patented Mar. 27, 1962

3,027,394
PROCESS FOR PREPARING SILICON-CONTAINING FLUIDS
Leonard Pierce, Jr., St. Albans, and Phil H. Miller, Charleston, W. Va., assignors to Union Carbide Corporation, a corporation of New York
No Drawing. Filed Dec. 2, 1959, Ser. No. 856,643
8 Claims. (Cl. 260—448.8)

This invention relates to a new method for preparing polyalkoxysiloxanes.

A variety of ester-type compounds have been suggested for use as base stocks in functional fluid applications, particularly where one or more characteristics of viscosity-temperature variation, pour point, lubricity and high-temperature stability are desired. Among such ester-type compounds known in the art are polyalkoxysiloxanes of the formula:

$$(RO)_3SiOSi(OR)_3$$

in which R is an aliphatic, alicyclic, aryl, or aralkyl radical. These silicate esters, identified as hexaalkoxydisiloxanes, have been described in the literature by Peppart et. al. [J. Am. Chem. Soc., Vol. 68, p. 70 (1946)] and are indicated to be useful in the formulation of high temperature hydraulic fluids as reported in WADC Technical Report 54-191 by Furby et al. General methods of preparation for the synthesis of these polyalkoxysiloxanes may be represented by the following reactions:

(1) HYDROLYSIS OF TRIALKOXY-CHLOROSILANE

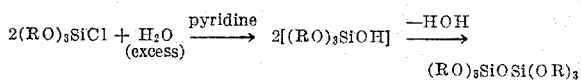

(2) HYDROLYSIS OF TRIALKOXY-AMINOSILANE

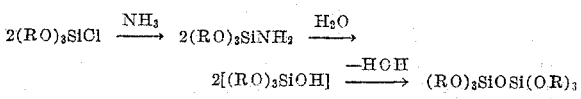

(3) ALCOHOLYSIS OF HEXACHLORO-DISILOXANE

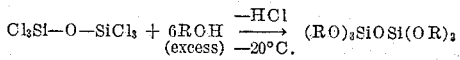

(4) HYDROLYSIS OF TRIALKOXY-CHLOROSILANE

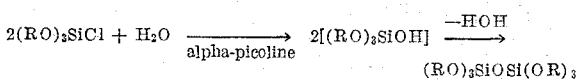

Although the polyalkoxysiloxanes possess certain desired physical characteristics, more so, for example, than mineral oils of the corresponding viscosity level, their use as a synthetic base fluid has been handicapped to some extent due to the number of processing steps required in the synthesis. For example, in the hydrolysis of trialkoxychlorosilane illustrated above, silicon tetrachloride is first reacted with three equivalents of alcohol in a batch reaction to form trialkoxychlorosilane. Thereafter the chlorosilane is hydrolyzed with water in the presence of an acid acceptor, alpha-picoline. The alpha-picoline hydrochloride is removed as an aqueous layer and the product layer is batchwashed three times with a brine solution to ensure complete removal of the picoline hydrochloride salt. The product is then stripped until the desired physical properties are obtained.

In accordance with the present invention it has been found that polyalkoxysiloxanes can be readily synthesized by the simultaneous reaction of silicon tetrachloride, alcohol, and water in specified mole ratios, followed by a continuous or batchwise stripping distillation to obtain a residue mixture of polyalkoxysiloxanes. As compared to conventional methods for the preparation of these silicate esters the advantages obtained by the present invention include a reduction in the number of processing steps, e.g., the elimination of acid acceptors, an increase in production capacity and a more readily controlled distribution of components in the product. The mixture of polyalkoxysiloxanes as well as the individual constituents which may be recovered by conventional means of separation possess good viscosity-temperature properties, high flash points and excellent resistance to aqueous hydrolysis. Because of their properties these ester-type compounds are particularly valuable in the formulation of high temperature aircraft hydraulic fluids.

As used throughout the specification and claims the terms "silicate ester" and "polyalkoxysiloxanes" are used interchangeably to identify esters, of one form or another, of ortho-silicic and polysilic acids.

In carrying out the method of the invention silicon tetrachloride, water and a water-immiscible alcohol are reacted simultaneously in proportions ranging from 3.50 to 15 moles of alcohol and 0.35 to 1.66 moles of water for each mole of silicon tetrachloride. For practical reasons imposed by a balance between the amount of by-product orthosilicate, hydrogen chloride and excess alcohol, the amount of alcohol employed preferably ranges from 3.50 to 12 moles per mole of silicon tetrachloride. The reaction is effected in any suitable equipment at temperatures from about −25 to 100° C. and preferably at temperatures between about 50 to 80° C.

The period of time required for the reaction will vary with such considerations as pressure and temperature. In general the reaction is complete after about 15 minutes to 5 hours of residence time of the reactants in the reactor. Following the reaction the product mixture is subject to a stripping distillation which involves distilling off, under reduced or atmospheric pressure, the excess alcohol, hydrogen chloride and orthosilicate formed during the reaction. The stripping distillation can be effected in a conventional manner in any suitable apparatus, such as a Vigreaux type column and vacuum receiving system, with the mixture of polyalkoxysiloxanes being recovered as the residue product. The temperature maintained during the stripping step will vary with the pressure involved and the mixture of products being distilled. In general at the head of the stripping column the temperature should not exceed the vapor temperature of the lowest boiling component in the mixture.

The mixtures of polyalkoxysiloxanes produced by the method of the invention possess good viscosity-temperature properties and excellent resistance to aqueous hydrolysis as determined by Federal Test Method 791, Method 5308. This combination of properties, which is unique in that both properties are found in the same product, is believed to be the result of cyclic and linear structures present in the reaction mixture due to the reactants and particular mole ratios employed in the method of preparation. The linear and cyclic compounds are polyalkoxysiloxane compounds of the following formulae in which R represents a monovalent aliphatic hydrocarbon radical of 4 to 20 carbon atoms.

(I) Linear polyalkoxysiloxanes in which $x$ is an integer of 0 to 4.

(II) Cyclic polyalkoxysiloxanes in which $x$ is an integer of 3 to 6.

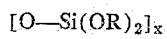

The reaction of silicon tetrachloride, water and water-immiscible alcohol, within the mole ratios previously described, provides a mixture comprising polyalkoxysiloxane products in which either compound indicated above by Formula I or II may be present in a predominant amount, that is, at least about 50 percent by weight based on the residue product recovered in the stripping distillation. Control of the structures present in the mixture is accomplished by varying the mole ratio of water employed. Thus a limited quantity of water results in products which are predominantly linear whereas if large amounts of water are used, the properties of the product formed are such as to suggest the formation of cyclic structures almost to the exclusion of linear compounds. It is understood of course that the particular choice of mole ratios of water does not provide a single product but rather a mixture of compounds in which either type of polyalkoxysiloxane compound, above noted, can be produced in predominant amounts.

To obtain mixtures comprising a predominant amount of linear polyalkoxysiloxane products corresponding to Formula I above, silicon tetrachloride, water and alcohol are reacted in a ratio of from 3.50 to 15 moles of alcohol and 0.35 to about 0.50 mole of water for each mole of silicon tetrachloride. For example, in the reaction of 2-ethylbutanol and water in mole ratios of 3.9 moles of alcohol and 0.35 mole of water per mole of silicon tetrachloride, the stripped reaction mixture comprises a predominant amount of hexa(2-ethylbutoxy)-disiloxane together with minor amounts of the corresponding orthosilicate, octaalkoxytrisiloxane, mixtures of tri- and tetrasiloxanes and higher polyalkoxysiloxanes. To obtain mixtures comprising a predominant amount of cyclic polyalkoxysiloxanes as indicated in Formula II, supra, silicon tetrachloride, water and alcohol are reacted in ratios of 3.50 to 15 moles of alcohol and about 0.50 to 1.66 moles of water for each mole of silicon tetrachloride. The product mixtures obtained after the stripping distillation predominate in what are believed to be cyclic polyalkoxysiloxanes together with minor amounts of highly branched, cross-linked and linear polyalkoxysiloxanes.

The complete chemical structures of the cyclic compounds have not been unequivocally established; however, determination of the ratio of alkoxy groups to silicon atoms derived from average molecular weights and average silica content, expressed as $SiO_2$, substantially preclude the presence of linear polyalkoxysiloxane molecules. For example, the ratio of alkoxy to silicon atoms is 4:1 in an orthosilicate, 3:1 in a disiloxane, 2.66:1 for a trisiloxane, etc. and 2:1 for a cyclic molecule of the type illustrated above. However, in the reaction of 6.0 moles of n-butanol with 0.862 mole of water and 1.0 mole silicon tetrachloride, as described hereinafter in Table I, the alkoxy to silicon ratio is 2.2 to 1 which would be the expected ratio of a decasiloxane. Since the alkoxy to silicon ratios are derived from average molecular weights and silica content, there would have to be a large number of siloxane chain lengths greater than ten in order to obtain this value. The physical properties of the product mixture substantially preclude the presence of linear siloxane molecules and the simplest chemical structures which are in accord with the physical properties and analytical data of the compounds are those of a cyclic structure.

The alcohols used in preparing the polyalkoxysiloxane products are the substantially water-immiscible, saturated, aliphatic, monohydric alcohols which contain 4 to 20 carbon atoms. Exemplary alcohols include branched chain and straight chain alcohols such as butanol, iso-butanol, hexanol, octanol, iso-octanol, 2-octanol, iso-nonanol, iso-decanol, decanol, dodecanol, tridecanol, tetradecanol, heptadecanol, nonadecanol, eicosanol, and mixtures thereof. Especially preferred types of alcohols containing 4 to 12 carbon atoms are the primary alcohols substituted in the 2-carbon position, such as 2-methylbutanol, 2-ethylbutanol, 2-methylpentanol, 2-ethylhexanol, and the secondry alcohols such as 2-butanol and 2- or 3-pentanol, etc. Tertiary alcohols, because of the relative ease of substitution of the tertiary hydroxyl group by hydrogen halides, are unsatisfactory for the purposes described herein. Other alcohols which may be used, but which are less desirable, include monoolefinic and polyolefinic alcohols such as oleyl alcohol and linoleyl alcohol; the cyclic alcohols, including mono- and polycyclic alcohols, such as naphthenic alcohols; alkyl and aryl monoethers of ethylene or propylene glycol or polyglycols, e.g., the monoethyl and monobutyl ethers of diethylene glycol and the monomethyl ether of 1,2- or 1,3-propylene glycol, etc.

The simultaneous reaction of silicon tetrachloride, water and alcohol, within the mole ratios described, can be carried out in a continuous or batchwise manner. In the batch-type preparation of the siloxane products it is frequently desirable, but not necessary, to carry out the reaction in an inert diluent such as the non-polar hydrocarbon solvents benzene, xylene, toluene, etc. Preferred materials are dioxane and any of the polysiloxane reaction products. The diluents can be used in amounts varying from about 0 to 50 percent by weight based on the total weight of the reactants. In a preferred method of operation, silicon tetrachloride and an aqueous mixture of the desired alcohol are fed continuously as separate streams into a stirred reactor through submerged inlet lines. In this manner a more efficient reaction is realized and the reaction medium serves as a diluent.

*Example I*

BATCHWISE REACTION OF 2-ETHYLBUTANOL, SILICON TETRACHLORIDE, AND WATER 175 grams of tetra(2-ethylbutyl) orthosilicate was charged to a 2-liter glass flask equipped with a mechanical stirrer, a thermowell, a brine-cooled reflux condenser, and a feed system consisting of three inlet tubes, extending to the bottom of the reaction flask, and two graduated feed tanks attached to two of the inlet tubes. Silicon tetrachloride, 530 grams (3.12 moles), was charged to one feed tank and 1272 grams of 2-ethylbutanol containing 1.5 percent water was charged to the other tank. The 2-ethylbutanol feed contained 1.06 moles of water and 12.25 moles of alcohol. Agitation of the orthosilicate was begun and the feeds started. The rates of addition of both feed streams were adjusted to require two hours for completion of the addition. The temperature of the reaction mixture averaged 35° C. during the two-hour period. After all of the feeds had been completed, a stream of nitrogen at a rate of two cubic feet per hour was introduced into the system through the third inlet tube to help sweep out the hydrogen chloride formed during the reaction. The system was gradually heated up to 125±5° C. and maintained at this temperature while sparged with nitrogen for three hours to reduce the residual acidity of the mixture. The reaction product (1551 grams) was transferred to a distillation system comprised of a two-liter kettle, a 32 x 130 mm. glass column packed with protruded stainless steel, a condensing head, and a vacuum receiving system. Two grams of soda ash was added, the system pressure was reduced to 10 mm. of Hg, and heat was applied to the kettle. Unreacted 2-ethylbutanol (284 grams) was recovered as the first fraction boiling from 53° C. to 56° C. at 10 mm. of Hg. An intermediate fraction (24 grams) was collected while reducing the system pressure to 1 mm. of Hg and raising the vapor temperature to 147° C. A small fraction of tetra(2-ethylbutyl) orthosilicate (45 grams) was collected until the kettle temperature reached 220° C. at which point the distillation was shut down and allowed to cool. The residue product was transferred to a stripping system consisting of a one-liter kettle surmounted by a Vigreaux packed 32 x 120 mm. glass gooseneck and a vacuum receiving system. The product was stripped in this system to a final kettle temperature of 200° C. at 1 mm. of Hg. 440 grams of a mixture of 95 percent orthosilicate and 5 percent disiloxane was stripped off at these conditions. The residue product (769 grams) had viscosities of 3.72 cs. at 210° F., 10.31 cs. at 100° F., and 672 cs. at −65° F., and a flash point of 410° F. The yield of residue product, calculated as disiloxane, was 72.5 percent based on silicon tetrachloride and 106.5 percent based on water.

*Examples II to XIII*

Various silicate esters were prepared in a similar procedure to Example I. A summary of Examples II to XIII is present in Table I below.

Specification Test, Federal Test Method No. 791; 3457. The test is carried out by adding 33 percent by weight water to the silicate ester in the presence of a polished copper strip. The heterogeneous mixture is oven heated at 200° F. in a tumbling beverage bottle for 48 hours. All silicates were inhibited with 0.03 percent quinizarin and 2.0 percent p,p′-dioctyldiphenylamine. As shown below in Table II all the fluids, with the exception of the isopropoxy and 2-methoxyethoxy derivatives, Examples XII and XIII, more than passed the percent insolubles and viscosity increase specification required of MIL-H-8446B. None of the fluids exhibited a detect-

TABLE I

| Example | 2 | 3 | 4 | 5 | 6 | 7 | 8 | 9 | 10 | 11 | 12 | 13 |
|---|---|---|---|---|---|---|---|---|---|---|---|---|
| Alcohol** | | | | | | | | | | | | |
| Mole Ratio of Alcohol to SiCl$_4$ to H$_2$O | 6/1/0.862 | 6/1/0.862 | 6/1/0.862 | 6/1/0.862 | 6/1/0.862 | 6/1/0.862 | 6/1/0.862 | 6/1/0.862 | 6/1/0.4 | 6/1/0.4 | 6/1/0.862 | 6/1/0.862 |
| Reaction Temperature, °C | 60–70 | 55–61 | 41–58 | 42–57 | 40–53 | 41–52 | 45–50 | 41–64 | 41–54 | 46–55 | 57–64 | 41–65 |
| Residence Time, Minutes (a) | ←——————————————————approximately 15 minutes——————————————————→ | | | | | | | | | | | |
| Yield of Residue Product, grams per gram of SiCl$_4$ | 1.15 | 1.21 | 1.55 | 1.57 | 1.98 | 2.12 | 2.28 | 1.46 | 2.0 | 1.55 | 1.61 | 1.12 |
| Physical Properties of Residue Product— Viscosity: | | | | | | | | | | | | |
| cs. at 210° F | 2.85 | 3.80 | 8.1 | 5.04 | 7.18 | 8.98 | 8.47 | 4.32 | 2.167 | 1.7 | 3.99 | 15.88 |
| cs. at 100° F | 6.92 | 11.13 | 25.8 | 14.69 | 25.0 | 36.05 | 37.9 | 12.45 | 5.59 | 3.75 | 12.66 | 40.1 |
| cs. at −65° F | 160.5 | 663 | 2,393 | 1,345 | *1,595 | *2,706 | 6,530 | 974 | 299.5 | 112.5 | 5,709 | 4,116 |
| Flash Point, °F. (COC) (b) | 360 | 335 | 425 | 435 | 470 | 425 | 465 | 445 | 400 | 270 | 270 | 205 |
| Fire Point, °F. (COC) (b) | 395 | 360 | 505 | 495 | 555 | 490 | 600 | 535 | 445 | 300 | 295 | 215 |
| Silica Analysis, percent SiO$_2$ | 30.4 | 28.6 | 22.3 | 22.0 | 17.7 | 15.9 | 14.8 | 23.8 | 16.8 | 22.3 | 36.2 | 31.8 |
| Experimental Mol. Wt | 710 | 645 | 900 | 840 | 952 | 775 | 1,185 | 1,036 | 572 | 424 | | |
| Number of Alkoxy Groups Per Gram Mol. Wt | 7.9 | 7.2 | 7.62 | 7.13 | 6.55 | 5.43 | 6.83 | 8.63 | 5.18 | 5.07 | | |
| Moles of Si Per Gram Mol. Wt | 3.6 | 3.07 | 3.34 | 3.08 | 2.81 | 2.05 | 2.92 | 4.12 | 1.60 | 1.58 | | |
| Ratio of Alkoxy/Si | 2.2/1 | 2.35/1 | 2.28/1 | 2.32/1 | 2.33/1 | 2.65/1 | 2.34/1 | 2.1/1 | 3.2/1 | 3.21/1 | | |

(a) Residence time was calculated as the operating volume of the reactor multiplied by sixty and divided by the total volume of combined feeds per hours.
(b) Cleveland Open Cup.
*−40° F.
**Alcohols used in examples.
2. n-Butanol
3. Isobutanol
4. 2-Ethylbutanol
5. 2-Methylpentanol
6. 2-Ethylhexanol
7. 2,2,4-Trimethylpentanol
8. Isodecanol
9. n-Hexanol
10. n-Hexanol
11. Isobutanol
12. Isopropanol
13. 2-Methoxyethanol The silicate esters of Examples II to XIII were tested for hydrolytic stability in accordance with MIL-H-8446B Specification Test, Federal Test Method No. 791; 3457.

able acid number increase and none affected the copper strip.

TABLE II

*Hydrolytic Stability Test*

| Example | Alkoxy Group of Polyalkoxysiloxane | Percent Insolubles from Hydrolytic Stability Test |
|---|---|---|
| 4 | 2-Ethylbutoxy | 0.019 |
| 6 | 2-Ethylhexoxy | 0.026 |
| 3 | Isobutoxy | 0.028 |
| 5 | 2-Methylpentoxy | 0.042 |
| 8 | Isodecoxy | 0.049 |
| 9 | n-Hexoxy | 0.060 |
| 2 | n-Butoxy | 0.065 |
| 7 | 2,2,4-Trimethylpentoxy | 0.075 |
| 12 | Isopropoxy | 1.78 |
| 13 | 2-Methoxyethoxy | gel |
| MIL-H-8446B Specification: Insolubles, percent by weight | | 0.2 |
| Viscosity Increase, percent | | −5 to +15 |

Example XIV 2-ethylbutanol, silicon tetrachloride, and water were reacted in the same manner as Example I. The mole ratio of the reactants was 6.06:1.0:0.826. The kettle temperature during this reaction was about 55 to 60° C. and the addition time was two hours. After stripping the reaction mixture, the residue product analyzed as follows:

| | |
|---|---|
| Viscosity, cs. at 210° F | 6.93 |
| Viscosity, cs. at 100° F | 21.55 |
| Viscosity, cs. at −65° F | 2,149 |
| Flash point, ° F. (COC)[1] | 445 |
| Fire point, ° F. (COC)[1] | 475 |
| Alkoxy/Si ratio (approx.) | 2.3:1 |

[1] Cleveland open cup.

This application is a continuation-in-part of application Serial No. 698,903 filed November 26, 1957, now abandoned.

What is claimed is:

1. A method for preparing polyalkoxysiloxanes consisting essentially of simultaneously reacting at a temperature of from about −25 to 100° C. silicon tetrachloride, water and a monohydric alcohol selected from the group consisting of primary and secondary alcohols containing, from 4 to 20 carbon atoms, in mole ratios of from 3.50 to 15 moles of alcohol and 0.35 to 1.66 moles of water per mole of silicon tetrachloride; distilling the resulting reaction product and recovering a residue product comprising polyalkoxysiloxane.

2. The method of claim 1 wherein the mole ratio of water is from about 0.35 to 0.50 mole.

3. The method of claim 1 wherein the mole ratio of water is from about 0.50 to 1.66 moles.

4. A method for preparing polyalkoxysiloxanes consisting essentially of simultaneously reacting at a temperature of from about 50 to 80° C. silicon tetrachloride, water and a primary aliphatic alcohol containing 4 to 20 carbon atoms, in mole ratios of 3.50 to 12 moles of alcohol and 0.35 to 1.66 moles of water for each mole of silicon tetrachloride; vacuum distilling the reaction product and recovering a residue product comprising polyalkoxysiloxane.

5. The method of claim 4 wherein the alcohol is a primary aliphatic alcohol containing alkyl substitution in the 2-carbon position.

6. The method of claim 5 wherein the alcohol is 2-ethylbutanol.

7. The method of claim 5 wherein the alcohol is 2-ethylhexanol.

8. The method of claim 5 wherein the alcohol is 2-methylbutanol.

References Cited in the file of this patent

UNITED STATES PATENTS

| | | |
|---|---|---|
| 2,799,693 | Dodgson | July 16, 1957 |
| 2,846,459 | Morgan et al. | Aug. 5, 1958 |
| 2,917,467 | Olson et al. | Dec. 15, 1959 |

FOREIGN PATENTS

| | | |
|---|---|---|
| 621,742 | Great Britain | Apr. 19, 1949 |

OTHER REFERENCES

Konrad et al.: "Annalen der Chemie," vol. 474 (1929), pages 276–95, pps. 278 and 281–3 only needed.

Morgan et al.: Ind. and Eng. Chem., vol. 45 (November 1953), pages 2592–4.